United States Patent
Von-Wilmowsky et al.

(10) Patent No.: US 11,427,308 B2
(45) Date of Patent: Aug. 30, 2022

(54) ATTACHMENT OF A LANDING GEAR

(71) Applicant: AIRBUS HELICOPTERS DEUTSCHLAND GMBH, Donauworth (DE)

(72) Inventors: Kaspar Von-Wilmowsky, Gundelfingen (DE); Johannes Markmiller, Munich (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 185 days.

(21) Appl. No.: 16/821,130

(22) Filed: Mar. 17, 2020

(65) Prior Publication Data

US 2020/0216169 A1    Jul. 9, 2020

Related U.S. Application Data

(62) Division of application No. 14/489,607, filed on Sep. 18, 2014, now Pat. No. 10,625,848.

(30) Foreign Application Priority Data

Sep. 30, 2013   (EP) ..................... 13400020

(51) Int. Cl.
  *B64C 25/04*   (2006.01)
  *B64C 25/52*   (2006.01)
  *B64C 25/06*   (2006.01)
  *B64C 27/04*   (2006.01)
  *B64C 25/32*   (2006.01)

(52) U.S. Cl.
  CPC ............. *B64C 25/04* (2013.01); *B64C 25/06* (2013.01); *B64C 25/52* (2013.01); *B64C 27/04* (2013.01); *B64C 2025/325* (2013.01)

(58) Field of Classification Search
  CPC ......... B64C 25/52; B64C 25/06; B64C 25/04; B64C 27/04; B64C 2025/325
  See application file for complete search history.

(56) References Cited

U.S. PATENT DOCUMENTS

| | | | |
|---|---|---|---|
| 2,142,807 A | * | 1/1939 | Sznycer .................. B64C 25/52 244/108 |
| 2,223,834 A | | 12/1940 | Seltenreich et al. |
| 2,256,541 A | | 9/1941 | Armstrong |

(Continued)

FOREIGN PATENT DOCUMENTS

| WO | 2009097192 A2 | 8/2009 |
|---|---|---|
| WO | 2009097192 A3 | 8/2009 |

OTHER PUBLICATIONS

Extended European Search Report for EP 13400020.7, Completed by the European Patent Office, dated Feb. 28, 2014, 5 Pages.

*Primary Examiner* — Christopher D Hutchens
(74) *Attorney, Agent, or Firm* — Brooks Kushman P.C.

(57) ABSTRACT

A bracket for connecting a traverse of a landing gear to a cabin of a helicopter. A landing gear retainer is fixed around the traverse coaxially to the longitudinal direction of the traverse and at least one cabin clamp mount is fixed to the cabin. The landing gear retainer is in between the cabin and upper and lower pendulum bolts and upper and lower pendulum bearings. A pendulum is in longitudinal direction of the traverse hinged to the landing gear retainer. The invention is further related to an application of such brackets.

19 Claims, 6 Drawing Sheets

(56) References Cited

U.S. PATENT DOCUMENTS

| | | |
|---|---|---|
| 2,479,976 A | 8/1949 | Shultz |
| 2,522,350 A | 9/1950 | Ditter |
| 3,173,632 A | 3/1965 | Woods |
| 3,185,409 A | 5/1965 | Jacobsen |
| 3,716,208 A | 2/1973 | Fagan |
| 3,768,758 A | 10/1973 | Kubek |
| 4,270,711 A | 6/1981 | Cresap et al. |
| 4,519,559 A | 5/1985 | Logan et al. |
| 4,558,837 A | 12/1985 | Mens et al. |
| 4,821,983 A | 4/1989 | Aubry et al. |
| 5,045,649 A | 9/1991 | Ramsey et al. |
| 5,224,669 A | 7/1993 | Guimbal |
| 6,244,538 B1 | 6/2001 | Howard et al. |
| 2010/0308156 A1 | 12/2010 | Landry |
| 2011/0233323 A1* | 9/2011 | Engleder ............... B64C 25/52 |
| | | 244/17.17 |
| 2011/0248115 A1 | 10/2011 | Proia |
| 2012/0080560 A1 | 4/2012 | Piccone et al. |
| 2015/0151836 A1 | 6/2015 | Prudhomme-Lacroix et al. |
| 2016/0167773 A1 | 6/2016 | Cranga |

* cited by examiner

ATTACHMENT OF A LANDING GEAR

CROSS REFERENCE TO RELATED APPLICATION

This application is a division of U.S. application Ser. No. 14/489,607 filed on Sep. 18, 2014, now U.S. Pat. No. 10,625,848, issued on Apr. 21, 2020, which claims priority to European Patent Application No. 13 400020.7 filed on Sep. 30, 2013, the disclosures all of which are hereby incorporated in their entirety by reference herein.

BACKGROUND OF THE INVENTION

(1) Field of the Invention

The invention is related to a bracket for connecting a traverse of a landing gear to a cabin of a helicopter. The invention is further related to the application of an inventive attachment with the brackets for connecting a traverse of a landing gear to a cabin of a helicopter.

(2) Description of Related Art

Vibrations or resonance modes are produced, when a helicopter (HC) lands for example on the front part of its landing gear (LG), e.g. when landing on a slope. Those resonance frequencies and resonance modes can cause the HC to become inoperable due to ground resonance. A landing gear assembly comprises typically a pair of cross tubes or traverses and a pair of struts connected at the outboard ends of the cross tubes or traverses.

The document U.S. Pat. No. 4,270,711 A discloses a helicopter landing gear assembly with a pair of cross tubes having a pair of struts connected at the outboard ends thereof. A first of the cross tubes is connected to the helicopter fuselage at a pair of laterally spaced points. The second of the cross tubes is joined by a pivot connection to a structural bridge positioned above the second cross tube. The structural bridge is connected at its outer ends to the fuselage main beams. The structural bridge connected to the second cross tube permits the helicopter fuselage to pivot about a fore-aft axis thereof to lower the natural roll frequency of the helicopter airframe and therefore increase the margin of stability to prevent ground resonance.

The document U.S. Pat. No. 6,244,538 B1 discloses a skid landing gear for a helicopter, in which the directional stiffnesses of the cross members of the skid landing gear have been de-coupled from one another, such that optimization of the longitudinal stiffness of the cross members may be performed independently of the optimization of the vertical stiffness and fatigue life of the cross members. In order to de-couple the stiffnesses in the skid type landing gear, two approaches are employed. In the first approach, the skid landing gear has non-symmetric-section cross members and/or distribution of different materials within the cross-section for de-coupling the vertical stiffness of the cross members from the longitudinal stiffness, such that placement of the ground resonance frequency may be optimized, while retaining the vertical stiffness properties essential for optimizing vertical energy attenuation and fatigue life. In the second approach, mounting devices are employed that provide compliance in selected directions, thereby de-coupling the directional stiffnesses.

The helicopters known from the state of the art require specific adaption of the landing gears and/or cabins for the prevention of ground resonance.

BRIEF SUMMARY OF THE INVENTION

The object of the invention is to provide a helicopter with a landing gear and a cabin with an inherent prevention of vibrations without any or as little as possible constructive modifications of the cabin and/or of the LG.

The solution is provided with an attachment of a landing gear to a cabin of a helicopter with a bracket for connecting a traverse of the landing gear to the cabin of the helicopter and with the application of such a bracket.

According to the invention an attachment of a landing gear to a cabin of a helicopter is provided with a bracket for connecting a traverse of the landing gear to preferably at least one cabin clamp mount fixed to a bottom of the cabin of the helicopter. A longitudinal direction of the traverse is essentially perpendicular to a longitudinal direction of the cabin/helicopter. The bracket comprises a landing gear retainer fixed by clamping rings about the traverse coaxially to the longitudinal direction of the traverse. The landing gear retainer is adapted to be fixed to the preferably at least one cabin clamp mount by means of a pendulum and at least one upper and at least one lower pendulum bolts in at least one upper and at least one lower pendulum bearings of the pendulum.

In some embodiments, the at least one upper pendulum bolt in the at least one upper pendulum bearing is in between the landing gear retainer and the at least one lower pendulum bolt in the at least one lower pendulum bearing. For a rotational degree of freedom about a longitudinal direction of the helicopter/cabin relative to the LG the pendulum is for mobility of the cabin in longitudinal direction of the traverse, the pendulum being hinged to the cabin with the lower pendulum bolts in the lower pendulum bearings; and the pendulum is for mobility in longitudinal direction of the traverse, the pendulum being hinged to the landing gear retainer with the upper pendulum bolts in the upper pendulum bearings.

The inventive attachment with preferred embodiments of the bracket allows prevention of vibrations by upgrading exclusively the connection between the LG and the HC for the prevention of vibrations without constructive modifications of the cabin and/or the LG, such constructive modifications of the cabin and/or the LG being particularly cumbersome. The inventive attachment with the bracket for connection of the cabin to the LG provides an oscillation isolation level between cabin and LG, in which any vibrations and resonance mode of a disturbing oscillation become so "detuned" that the helicopter is out of resonance, for example ground resonance, with the excitation frequencies from the rotors in operation. The pendulum of the inventive attachment with the bracket with its upper end hinged to the LG and its lower end hinged to the cabin provides for a stable equilibrium, as long as the cabin's gravity rests on the LG.

The invention provides the following advantages:

Elements of the cabin and/or the LG remain essentially unchanged for detuning vibration, which would be really expensive, but exclusively the brackets connecting the cabin to the LG are changed. Thus the inventive connection of a landing gear to a cabin of a helicopter is realizable at low cost.

The inventive attachment with the brackets is exchangeable with brackets of the state of the art. Inventive attachments with the brackets can also at any time be upgraded on an existing helicopter without major changes of elements in the helicopter.

The inventive attachment with the brackets is relatively lightweight and compact compared with systems conceived to "absorb" disturbing oscillations by damping.

Optional equipment of the LG, such as a hook for external loads etc., installed on the LG, is not affected by the inventive attachment with the brackets, as the pendulum is very compact in the area of the inventive attachment with the brackets of the LG.

The LG qualities concerning crash remain unchanged with the inventive attachment with the brackets. A new certification of the LG shall therefore not be necessary.

According to a preferred embodiment of the invention the pendulum comprises at least one rod laterally mounted to the landing gear retainer.

According to a further preferred embodiment of the invention the landing gear retainer has a distance ≥0 to the upper pendulum bolts in the respective upper pendulum bearings.

The oscillating motion of the cabin traverse to the longitudinal direction of the cabin is determined in relation to the LG through spring elements and the pendulum bearings of the inventive attachment with the brackets. The spring elements are essentially oriented perpendicular to the pendulum in a neutral position with no deflection of the pendulum relative to the spring elements to decrease transversal movements of the spring elements of the LG once the pendulum moves in direction of the spring elements. The pendulum bearings of the inventive attachment with the brackets with their respective rotation axis are perpendicular to the longitudinal direction of the traverse and thus mobility is provided of the cabin relative to the traverse perpendicular to the longitudinal direction of the cabin.

According to a further preferred embodiment of the invention an equal torque support bolt is provided for fixation of the landing gear retainer to the clamping rings for blocking any rotation of the landing gear retainer about the longitudinal direction of the traverse and for further limitation of the oscillating motion in longitudinal direction of the cabin/helicopter.

According to a further preferred embodiment of the invention compound springs are positioned preferably perpendicular to a plane defined by the pendulum in neutral position, in order to maximize effectiveness while displacements due to rotation of the LG towards and away from the cabin are minimized to an amount <6 mm during pendulousness. Thus the compound springs and the pendulum bearings of the inventive attachment with the brackets implement the oscillating motion of the cabin transverse to the longitudinal direction of the cabin with the stiffness of the cabin-LG assembly.

According to a further preferred embodiment of the invention stops are provided between the cabin clamp mount and the clamp rings to limit the deflection of the spring elements essentially oriented along the longitudinal direction of the traverse of the LG and in order to detour the load transmission while high forces are applied between cabin and LG during flight, e.g. flight with load on a load hook. Preferably each of two inventive attachments with the brackets mounted on a traverse at the right and at the left is provided with two stops pairwise arranged symmetrically with regard to the longitudinal direction of the traverse of the LG. The inventive attachment with the bracket mounted on the traverse at the right limits any movements to the left between cabin and LG while the inventive attachment with the bracket mounted on the traverse at the left limits any movements to the right between cabin and LG.

According to a further preferred embodiment of the invention stop plates with a stiffness >1000 N/mm and friction coefficients between 0.05 and 0.15 are provided between at least one cabin clamp mount and the landing gear retainer of an inventive attachment with the bracket to limit any movements essentially oriented transversal to the longitudinal direction of the traverse of the LG between the cabin and LG. Preferably a tolerance of approximately 0.5 mm is provided between the stop plates in the LG-retainer and the at least one inner cabin clamp mount to avoid friction from pendulousness between cabin and LG at little forces in longitudinal direction of the cabin. In case of higher forces in longitudinal direction of the cabin the stop plates interact at relatively low friction forces due to the friction coefficients between 0.05 and 0.15. The stop plates and the at least one inner cabin clamp mount coordinate with regard to wear and feature emergency operation characteristics.

According to a further preferred embodiment of the invention one of the inventive attachments with one bracket is mounted on a traverse at the front right and another one of the inventive attachments with one bracket is mounted on the front left of the traverse so that through the turning mobile pendulums the cabin can turn mainly about the longitudinal direction of the LG/cabin. It is also conceivable that this pendulum construction is used in each case at the rear right and/or rear left bracket.

According to a further preferred embodiment of the invention in respectively neutral positions a pendulum's plane through a right and a further pendulum's plane through a left bracket on one traverse axis are each oriented to a helicopter's center of gravity, wherein the neutral positions are defined by balanced forces from the compound springs on the respective pendulum and the respective pendulum's planes are defined by passing respectively through the upper and lower pendulum bolts in the upper and lower pendulum bearings of the pendula. According to a further advantage of the invention with these orientations of the pendulum's planes the cabin is restricted to a rotary motion about its longitudinal direction through the helicopter's center of gravity.

BRIEF DESCRIPTION OF THE SEVERAL VIEWS OF THE DRAWINGS

A preferred embodiment of the invention is presented by means of the following description with reference to the attached drawings.

DETAILED DESCRIPTION OF THE INVENTION

Figure 1:
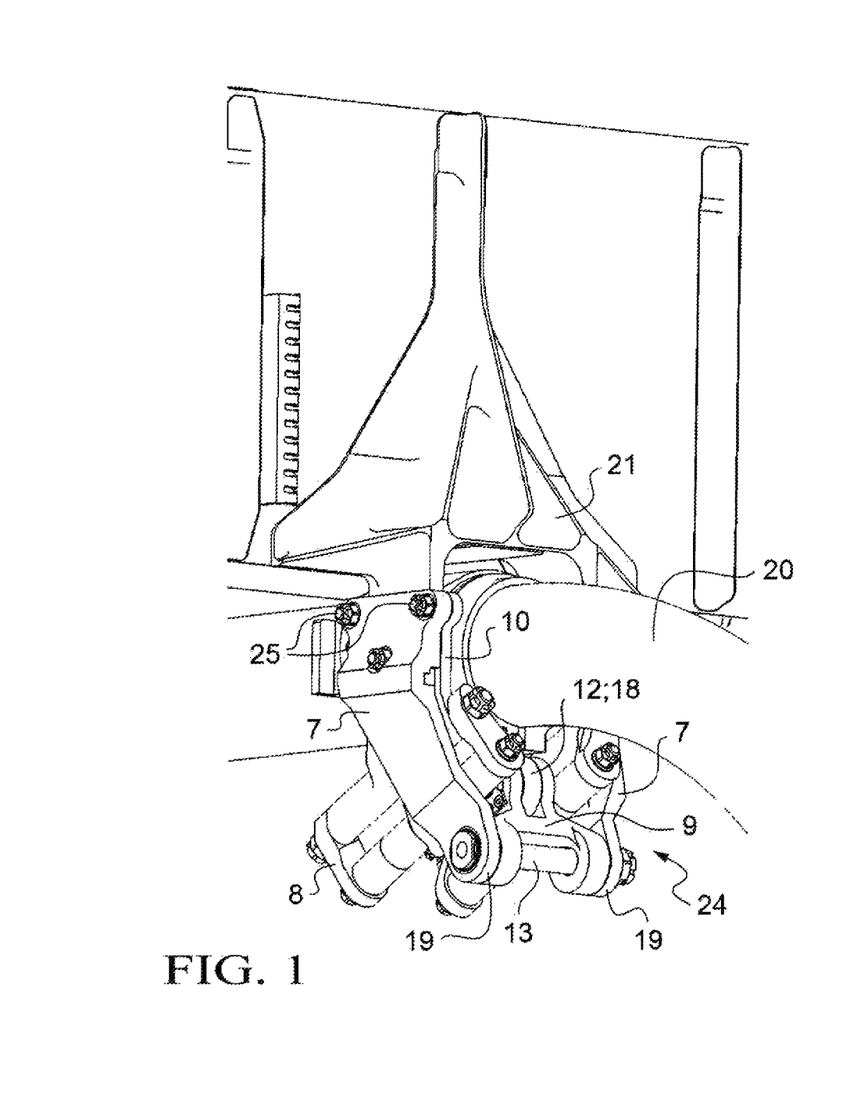
FIG. 1 shows a perspective view of parts of a traverse of a landing gear and a cabin with a bracket according to the invention.

According to FIG. 1 an attachment of a landing gear to a helicopter (not shown) comprises a bracket 24 mounted on a traverse 20 of the landing gear of the helicopter. The traverse 20 is mounted by means of the bracket 24 to a cabin bracket 21 integrated into a cabin of the helicopter.

The bracket 24 is provided with inner and outer cabin clamp mounts 7, 10 essentially symmetric to a longitudinal axis 29 (see FIG. 2) of the traverse 20. The bracket 24 is press mounted on the cabin bracket 21 by means of screwing connections 25 through the inner and outer cabin clamp mounts 7, 10.

A pendulum 9 is connected to the outer cabin-clamp mount 7 with a lower pendulum bolt 13 in lower pendulum bearings 19 and an upper pendulum bolt 12 in an upper pendulum bearing 18. The lower pendulum bolt 13 and the upper pendulum bolt 12 respectively extend essentially perpendicular to the longitudinal axis of the traverse 20. The lower pendulum bolt 13 in the lower pendulum bearings 19 of the pendulum 9 is hinged to the cabin bracket 21 via the outer cabin-clamp mount 7 for movements of the cabin in longitudinal direction relative to the traverse 20 and hence transverse to the longitudinal direction of the cabin.

Figure 2:
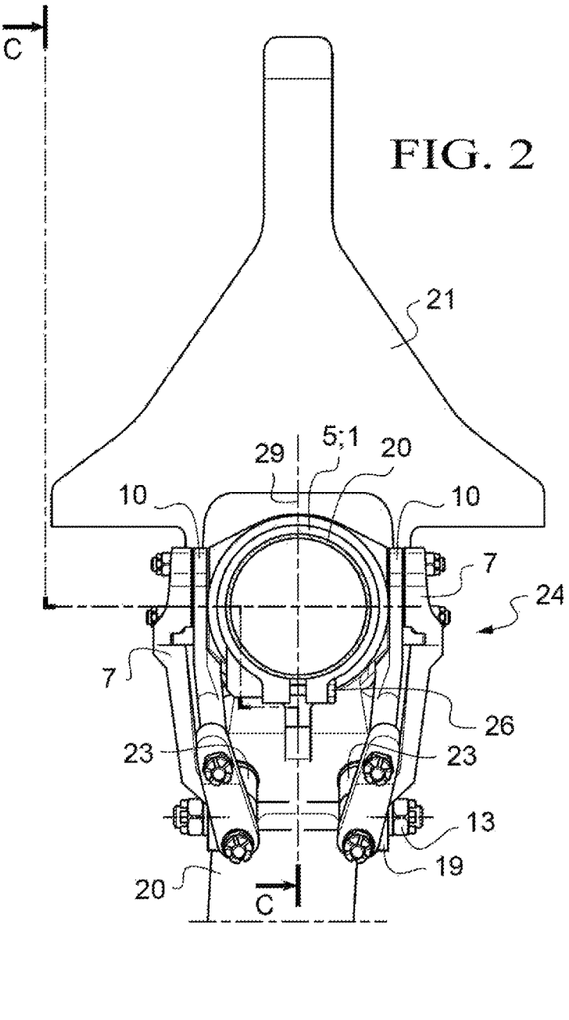
FIG. 2 shows a cross sectional view of the traverse of the landing gear with parts of the cabin and the bracket according to the invention.

According to FIG. 2 corresponding features are referred to with the references of FIG. 1. The bracket 24 is mounted on the cabin bracket 21 by means of the inner and outer cabin clamp mounts 7, 10. The inner and outer cabin clamp mounts 7, 10 are pairwise symmetric to the longitudinal axis 29 of the traverse 20.

A landing gear (LG) retainer 5 is mounted coaxially on the traverse 20 with clamp rings 1 at both sides, the clamp rings 1 being clamped respectively by screw connections 26 for tightening the grip of the clamp rings 1 on the traverse 20.

The press mounted inner and outer cabin clamp mounts 7, 10 on the cabin bracket 21 assure a form closure with tight clearances of the inner and outer cabin clamp mounts 7, 10 relative to the LG retainer 5 mounted on the traverse 20. The form closure restricts the freedom degree of the cabin transversal to the longitudinal axis 29 of the traverse 20 and parallel to the longitudinal direction of the cabin and further restricts the rotational freedom degree of the cabin about the longitudinal axis 29 of the traverse 20.

The inner cabin clamp mounts 10 are each connected to compound springs 23.

Figure 3:
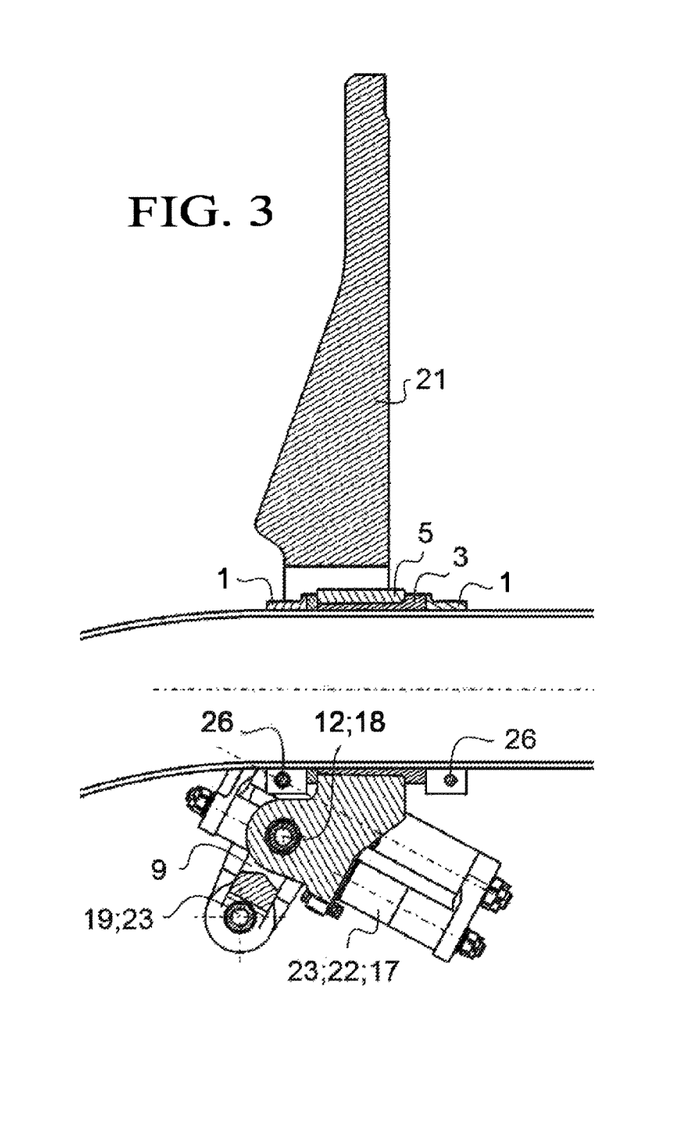
FIG. 3 shows a cross sectional view along the traverse of the landing gear with parts of the cabin and the bracket according to the invention.

According to FIG. 3 corresponding features are referred to with the references of FIG. 1, 2. Essentially perpendicular with regard to the effective direction of the compound spring 23 is provided the pendulum 9 connected to the LG-retainer 5 and the outer cabin-clamp mount 7 through the upper and lower pendulum bolts 12/13 in the upper and lower pendulum bearings 18/19. The upper and lower pendulum bolts 12/13 in the upper and lower pendulum bearings 18/19 respectively extend essentially perpendicular to the longitudinal axis of the traverse 20.

A stop (not shown) is provided between the cabin clamp mount 10 and the clamp rings 1.

Inside the compound spring 23 is coaxially pretensioned a fork bolt 22. The compound spring 23 comprises a spring bolt and several springs made of an essentially hollow cylindrical-type elastomeric material.

Two essentially circular clamp rings 1 of an LG-retainer 5 are slotted in radial direction and clamped respectively by screw connections 26 separate along a longitudinal axis on the LG-traverse 20. The LG-retainer 5 is fixed by the clamp rings 1, preferably separated through an optional elastomer ring 3 to avoid metallic contact between the LG-retainer 5 and the clamp rings 1.

Figure 4:
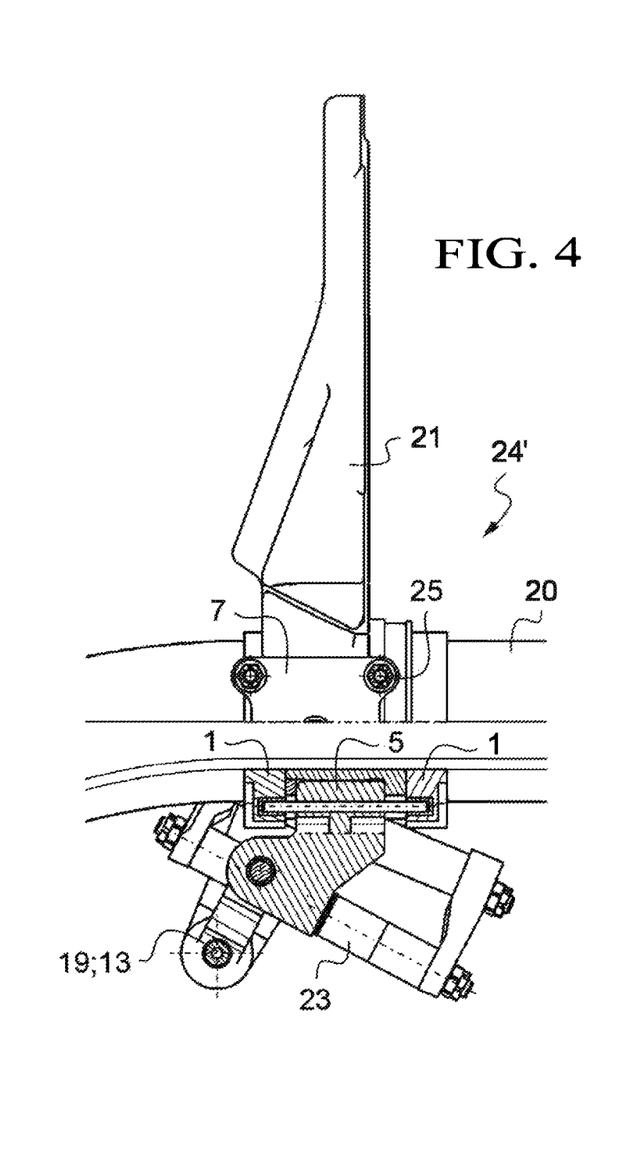
FIG. 4 shows a cross sectional view of the traverse of the landing gear with parts of the cabin and an alternative bracket according to the invention.

According to FIG. 4 corresponding features are referred to with the references of FIGS. 1-3. An alternative bracket 24' with less tight clearances of the inner and outer cabin clamp mounts 7, 10 relative to the LG retainer 5 and thus less restrictions for the rotational freedom degree of the cabin about the longitudinal axis 29 of the traverse 20 is provided with a torque support bolt 14 essentially parallel to the longitudinal axis of the traverse 20.

The torque support bolt 14 extends through the LG-retainer 5 and the clamp rings 1.

Figure 5:
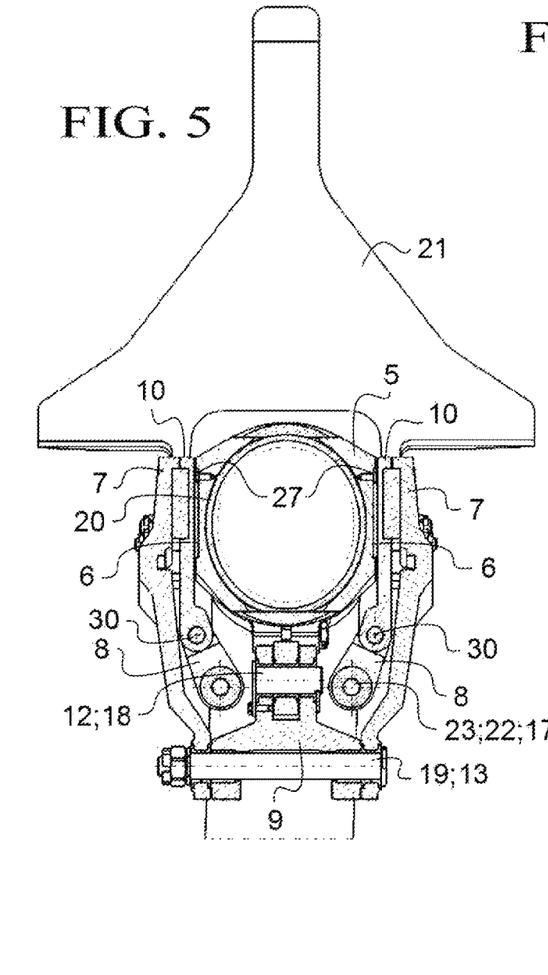
FIG. 5 shows parts of the cabin and a cross sectional view of the traverse of the landing gear and the bracket according to the invention.

According to FIG. 5 corresponding features are referred to with the references of FIGS. 1-4. Stop plates 6 are provided in the LG-retainer 5 in respective planes essentially transversal to the longitudinal axis of the traverse 20 and essentially transversal to the longitudinal axis of the cabin. The stop plates 6 are parallel to inner surfaces of each of the inner cabin clamp mounts 10. Each stop plate 6 is mounted in the LG-retainer 5 by screws 27 with form closure. Each stop plate 6 provides a stop for any movements of any of the inner cabin-clamp mounts 10 towards the LG-retainer 5. Each stop plate 6 has a stiffness >1000 N/mm. The LG-retainer 5 and the inner cabin-clamp mount 10 have clearances <0.5 mm between each other in longitudinal cabin direction. For low friction between the inner cabin clamp mounts 10 and the stop plates 6 from pendulousness between cabin and LG in longitudinal direction of the traverse 20 the surfaces of the inner cabin clamp mounts 10 are made of steel, titanium or coated aluminum and the stop plates 6 are made of sintered bronze coated with Polytetrafluoroethylene (PTFE).

Each of the inner cabin clamp mounts 10 is preferably connected on both sides of the bracket 24 with a spring fork 8 by a respective bolting and bolt connection 30. The compound springs 23 on both sides of the bracket 24 with the several springs and pretensioned by the respective fork bolt 22 and spring bolt 17 are mounted to the spring forks 8.

Essentially perpendicular with regard to the effective direction of the compound spring 23 is provided the pendulum 9 connected to the LG-retainer 5 and the outer cabin-clamp mount 7 through the upper and lower pendulum bolts 12/13 in the upper and lower pendulum bearings 18/19. The upper and lower pendulum bolts 12/13 in the upper and lower pendulum bearings 18/19 respectively extend essentially perpendicular to the longitudinal axis of the traverse 20.

Figure 6:
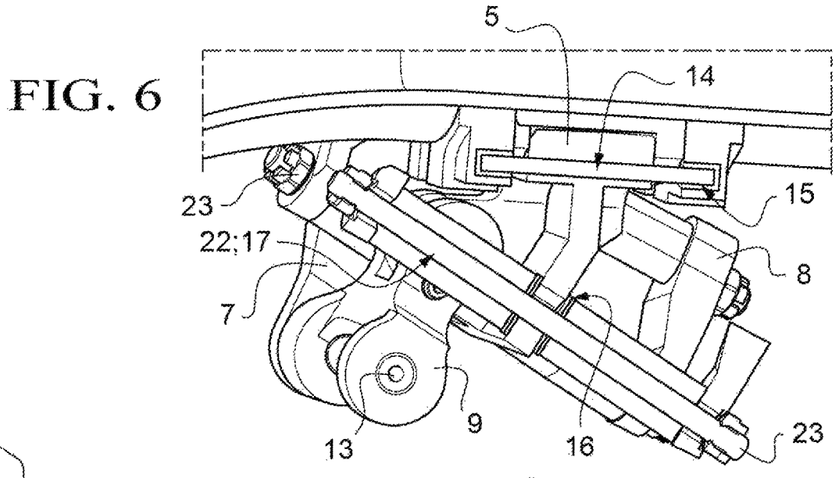
FIG. 6 shows cross sectional view of parts of the landing gear with the traverse and through a compound spring of the bracket according to the invention.

According to FIG. 6 corresponding features are referred to with the references of FIGS. 1-5. Each of the two essentially parallel compound springs 23 rests on a washer 16. The washer 16 is mounted on the LG-retainer 5. The washer 16 is made of a sintered material in order to decrease friction between the washers 16 and the compound spring 23. The LG-retainer 5 is blocked from rotation about the traverse 20 by the equal torque support bolt 14 in a torque support bearing 15. The washers 16 and the LG-retainer 5 are equipped with long hole bearings to allow relative movements of the compound spring 23 perpendicular to the washers' axes due to oscillations of the pendulum 9 induced via the cabin clamp mounts 7, 10 from any imbalances of the operating rotors. The torque support bolt 14 is articulated in the torque support bearings 15 made of plastic. The stiffness of the compound springs 23 is about between 100 and 800 [N/mm] at the LG-traverse 20 in the neutral position.

Cabin clamp mount 10 and the clamp rings 1 can limit the deflection of the compound spring 23 by a stop, in order to detour the load transmission at high forces between cabin and LG during flight, e.g. during flight with load on a load hook of the LG.

Figure 7:
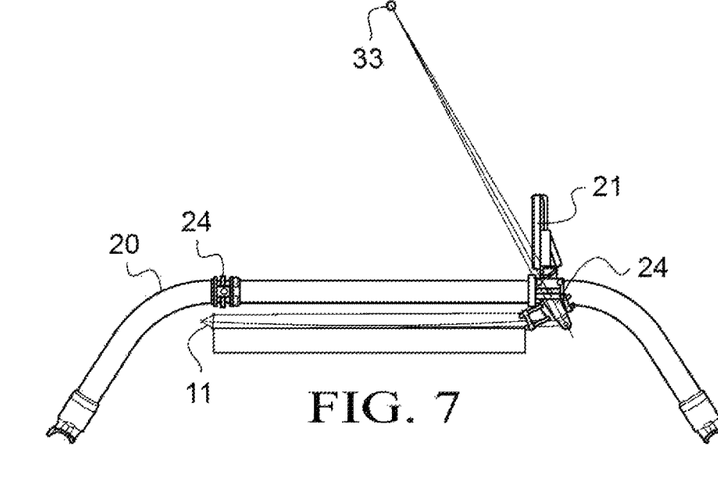
FIG. 7 shows an application of the bracket according to the invention.

According to FIG. 7 corresponding features are referred to with the references of FIGS. 1-6.

According to an application of a plurality of the brackets 24 the traverse 20 of the front LG is equipped with one bracket 24 on each side, i.e. right side and left side symmetrically mirrored along the cabin's longitudinal and vertical middle plane to connect the cabin with the LG. The aft LG-traverse is rigidly connected to the helicopter in a conventional way.

With one bracket 24 mounted on a front traverse 20 at the right and another bracket 24 mounted on the front traverse 20 at the left of the cabin, planes extending from each of the pendulums 9 in a neutral position 11 of both parallel brackets 24 on both sides of the traverse 20 are oriented to run through a cabin's center of gravity 33 at about 1.1 m above the traverse 20 of the LG allowing a cabin's pendulousness above the traverse 20 with a maximum pendulum-amplitude of +/−20 mm relative to the LG-traverse 20 along the longitudinal direction of the traverse 20. The pendulum-amplitudes are represented for the lower pendulum bolts 13 relative to the upper pendulum bolts 12 with the triangle about the neutral position 11. The triangle reflects as well the amplitudes varying the distance of the lower pendulum bolts 13 relative to the traverse 20, the amplitudes varying the distance being in the same range as the pendulum-amplitudes relative to the LG-traverse 20 along the longitudinal direction of the traverse 20.

Figure 8:
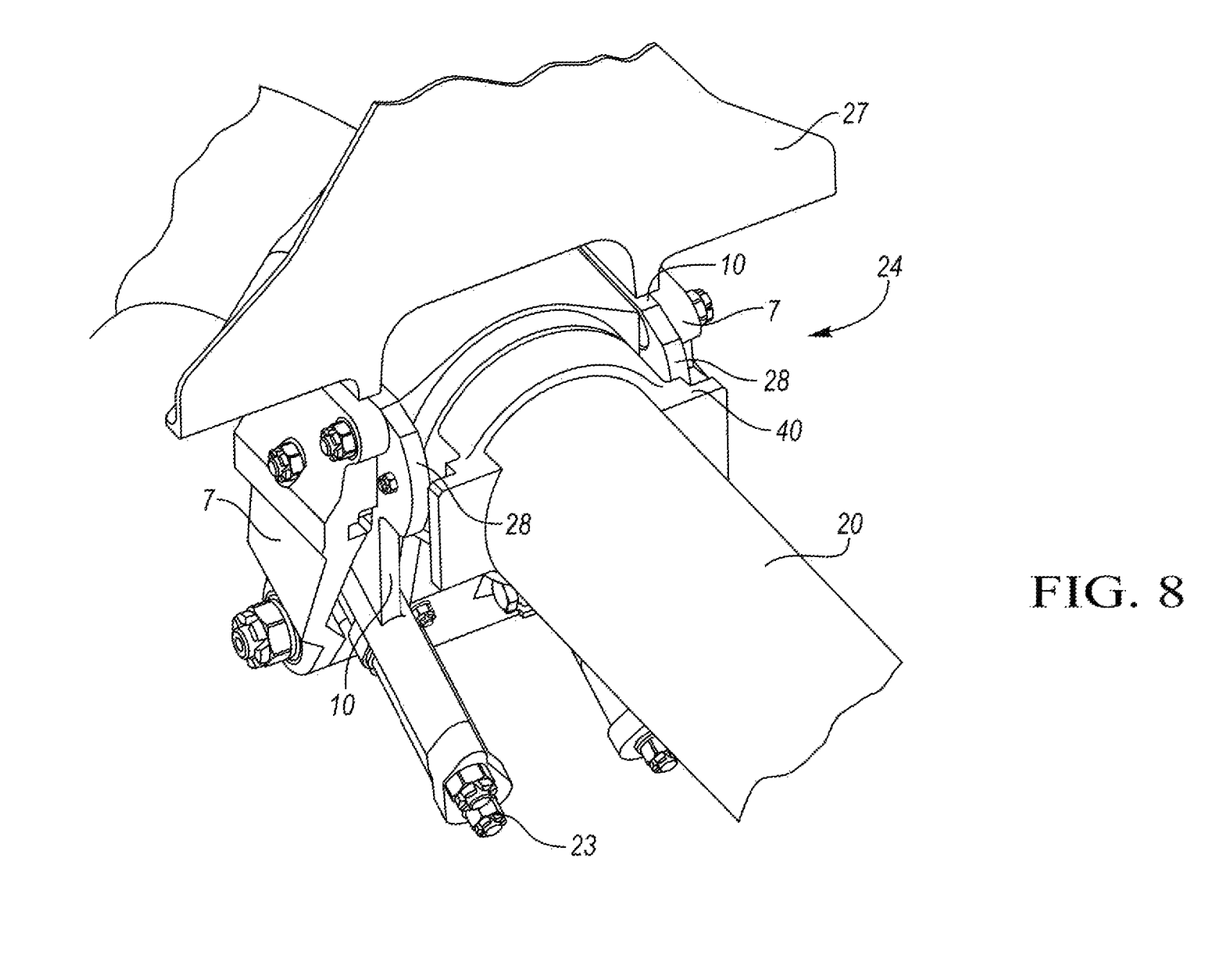
FIG. 8 shows a perspective view of alternative parts of a traverse of a landing gear and a cabin with a bracket according to the invention.

According to FIG. 8 corresponding features are referred to with the references of FIGS. 1-7. The attachment to one of the right or left sides of the traverse 20 of the landing gear to the helicopter (not shown) comprises the traverse 20 mounted by means of the bracket 24 to the cabin bracket 21 integrated into the cabin of the helicopter.

The brackets 24 provided with the inner and outer cabin clamp mounts 7, 10 essentially symmetric to the longitudinal axis 29 (see FIG. 2) of the traverse 20 and mounted on the traverse 20 at the right side and at the left side are each provided with two stops 28 arranged symmetrically with regard to the longitudinal direction of the traverse 20 of the LG. The clamp rings 1 arranged on the bracket side oriented towards the middle in longitudinal direction of the travers 20 are each equipped with two radially projecting abutments 40 pairwise arranged symmetrically with regard to the longitudinal direction of the traverse 20 for interaction with the two stops 28. The bracket 24 mounted on the traverse 20 at the right side limits any movements of the cabin towards the left side of the LG between cabin and LG while the bracket 24 mounted on the traverse 20 at the left side limits any movements to the right between cabin and LG by means respectively of the two abutments 40 interacting with the two stops 28.

Figure 9:
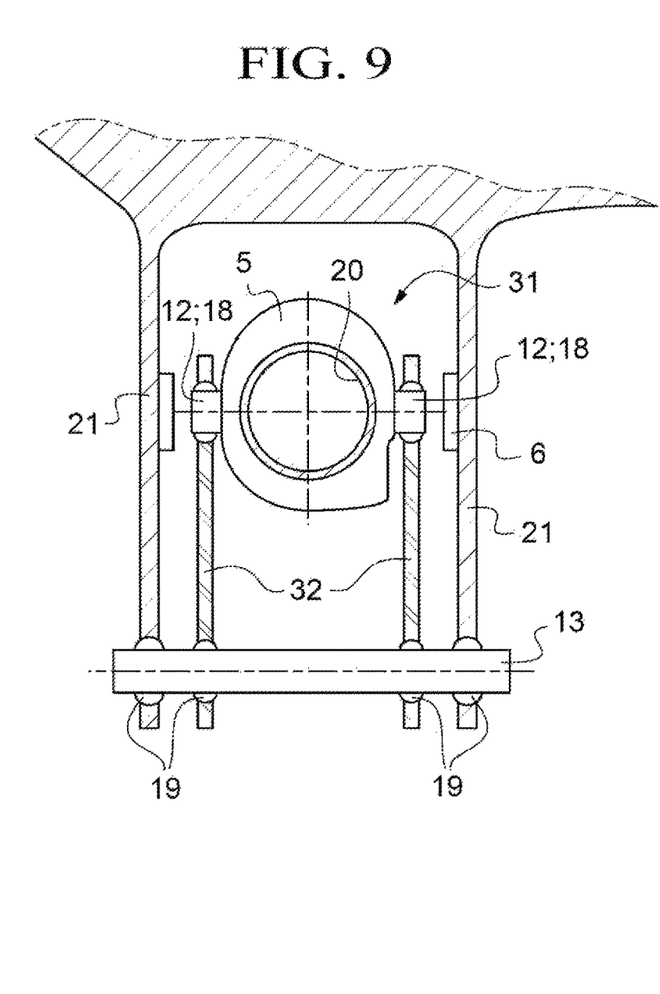
FIG. 9 shows a sketch of a cross sectional view of the traverse with a further alternative bracket according to the invention.

According to FIG. 9 corresponding features are referred to with the references of FIGS. 1-8. An attachment of the landing gear to the helicopter comprises a further alternative bracket 31 mounted by the clamping rings 1 on the traverse 20 of the landing gear of the helicopter. The traverse 20 is mounted by means of the alternative bracket 31 to the cabin bracket 21 integrated into the cabin of the helicopter.

The pendulum 9 comprises two rods 32 each connected to the LG retainer 5 by means of the upper pendulum bolts 12 in upper pendulum bearings 18 essentially symmetric to the longitudinal axis of the traverse 20 and the two rods 32 are each connected to the cabin-bracket 21 by means of a lower pendulum bolt 13 in lower pendulum bearings 19 essentially symmetric to the longitudinal axis of the traverse 20. The traverse 20 is with its upper half above the upper pendulum bolts 12 in the upper pendulum bearings 18.

Stop plates 6 are attached to respective inner sides of the cabin-brackets 21 on the level of the upper pendulum bolt 12 extending essentially perpendicular to the longitudinal axis of the traverse 20. The stop plates 6 are clear from the respective inner sides of the cabin-brackets 21 in perpendicular direction to the longitudinal axis of the traverse 20. The stop plates 6 transfer forces acting in the helicopter's longitudinal direction between the cabin-brackets 21 and the upper pendulum bolts 12. The stop plates 6 are preferably executed as a coating on the insides of the cabin-brackets 21.

Spring elements (not shown) are mounted between the cabin-brackets 21 and the LG-retainer 5.

Figure 10:
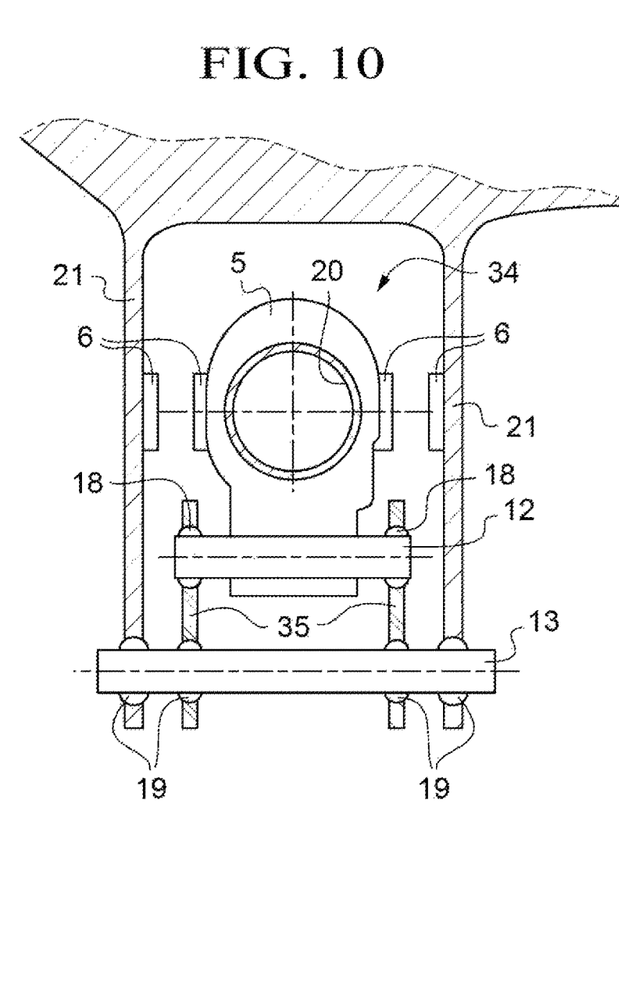
FIG. 10 shows a sketch of a cross sectional view of the traverse with a still further alternative bracket according to the invention.

According to FIG. 10 corresponding features are referred to with the references of FIGS. 1-9. An attachment of the landing gear to the helicopter comprises a still further alternative bracket 34 mounted on the traverse 20 of the landing gear of the helicopter. The traverse 20 is mounted by means of the alternative bracket 34 to the cabin bracket 21 integrated into the cabin of the helicopter.

The pendulum 9 comprises two short rods 35 each connected to the LG retainer 5 by means of the upper pendulum bolt 12 in upper pendulum bearings 18 essentially symmetric to the longitudinal axis of the traverse 20 and the two short rods 35 are each connected to the cabin-bracket 21 by means of a lower pendulum bolt 13 in lower pendulum bearings 19 essentially symmetric to the longitudinal axis of the traverse 20. The traverse 20 is above the upper pendulum bolt 12 in the upper pendulum bearings 18.

For the transfer of forces acting in the helicopter's longitudinal direction between the cabin-brackets 21 and the upper pendulum bolts 12 parallel stop plates 6 are attached to respective inner sides of the cabin-brackets 21 and on lateral sides of the LG-retainer 5 on the level of the upper pendulum bolt 12 extending essentially perpendicular to the longitudinal axis of the traverse 20. The stop plates 6 on the respective inner sides of the cabin-brackets 21 can be a coating of the cabin-brackets 21 or can be the cabin-brackets 21 themselves made of a material with characteristics resulting in low friction forces with the stop plates 6 attached to the respective lateral sides of the LG-retainer 5.

The stop plates 6 are clear from the respective inner sides of the cabin-brackets 21 in perpendicular direction to the longitudinal axis of the traverse 20. The LG-retainer 5 is blocked from rotation about the traverse 20 by the torque support bolt 14 held in the torque support bearing 15 in the clamping rings 1.

Spring elements (not shown) are mounted between the cabin-brackets 21 and the LG-retainer 5.

Figure 11:
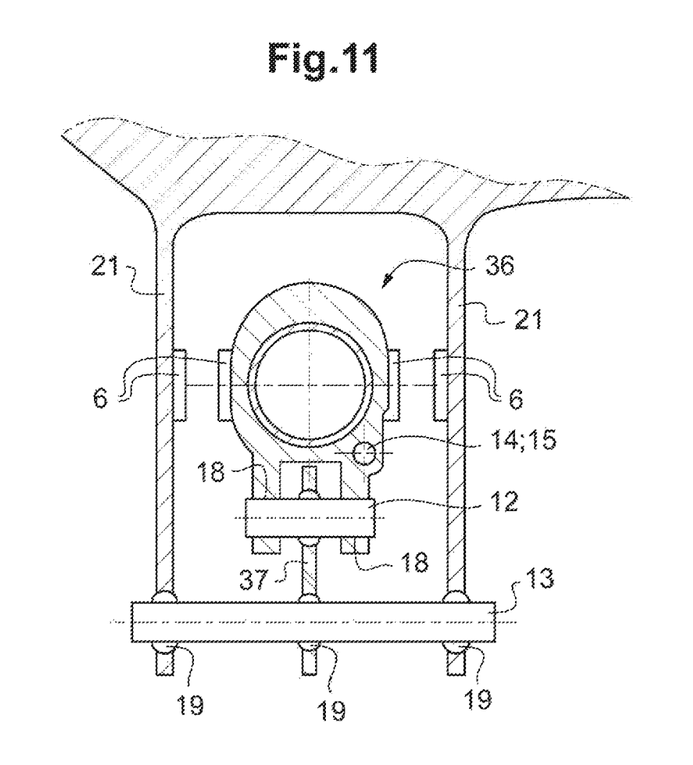
FIG. 11 shows a sketch of a cross sectional view of the traverse with another alternative bracket according to the invention.

According to FIG. 11 corresponding features are referred to with the references of FIGS. 1-10. An attachment of the landing gear to the helicopter comprises another alternative bracket 36 mounted on the traverse 20 of the landing gear of the helicopter. The traverse 20 is mounted by means of the alternative bracket 36 to the cabin bracket 21 integrated into the cabin of the helicopter.

The pendulum 9 comprises one central short rod 37 connected to the LG retainer 5 by means of the upper pendulum bolt 12 in upper pendulum bearings 18 integrated into the LG-retainer 5. The upper pendulum bolt 12 and the upper pendulum bearings 18 are essentially symmetric to the longitudinal axis of the traverse 20 and the short central rods 36 is connected to the cabin-bracket 21 by means of a lower pendulum bolt 13 in lower pendulum bearings 19 essentially symmetric to the longitudinal axis of the traverse 20. The traverse 20 is above the upper pendulum bolt 12 in the upper pendulum bearings 18.

Parallel stop plates 6 are attached to respective inner sides of the cabin-brackets 21 and on lateral sides of the LG-retainer 5 on the level of the upper pendulum bolt 12 extending essentially perpendicular to the longitudinal axis of the traverse 20. The stop plates 6 on the respective inner sides of the cabin-brackets 21 can be a coating of the cabin-brackets 21 or can be the cabin-brackets 21 themselves made of a material with characteristics resulting in low friction forces with the stop plates 6 attached to the respective lateral sides of the LG-retainer 5.

The stop plates 6 are clear from the respective inner sides of the cabin-brackets 21 in perpendicular direction to the longitudinal axis of the traverse 20. The LG-retainer 5 is blocked from rotation about the traverse 20 by the torque support bolt 14 held in the torque support bearing 15 in the clamping rings 1.

Spring elements (not shown) are mounted between the cabin-brackets 21 and the LG-retainer 5. According to FIG. 12 corresponding features are referred to with the references of FIGS. 1-11. An attachment of the landing gear to the helicopter comprises still another alternative bracket 38 mounted on the traverse 20 of the landing gear of the helicopter. The traverse 20 is mounted by means of the alternative bracket 38 to the cabin bracket 21 integrated into the cabin of the helicopter.

Figure 12:
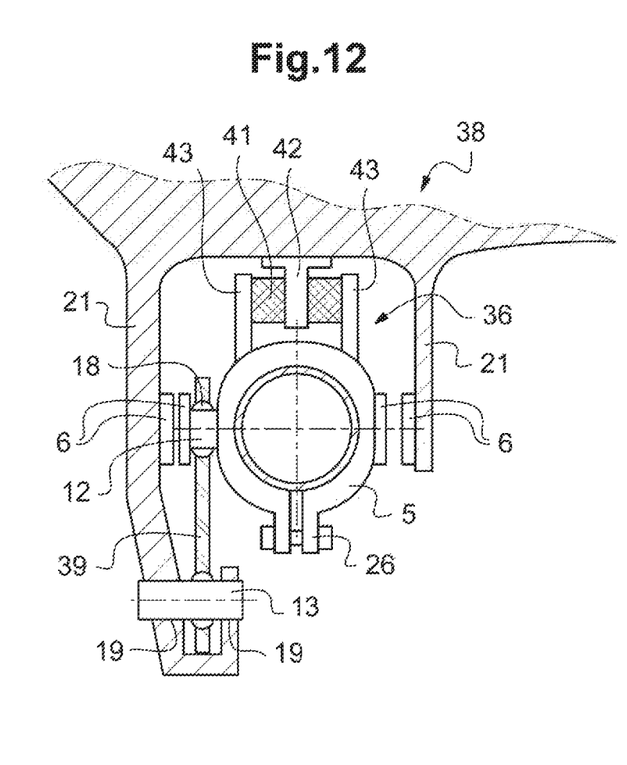
FIG. 12 shows a sketch of a cross sectional view of the traverse with still another alternative bracket according to the invention.

The pendulum 9 comprises one offset rod 39 connected to the LG retainer 5 by means of the upper pendulum bolt 12 in upper pendulum bearings 18 integrated into the LG-retainer 5 unilaterally. The upper pendulum bolt 12 and the upper pendulum bearings 18 are essentially on the level of the longitudinal axis of the traverse 20. The offset rod 39 is connected to the cabin-bracket 21 by means of a lower pendulum bolt 13 in lower pendulum bearings 19. The upper half of the traverse 20 is above the upper pendulum bolt 12 in the upper pendulum bearings 18.

Parallel stop plates 6 are attached to respective inner sides of the cabin-brackets 21 and on a lateral side of the LG-retainer 5 and on the upper pendulum bolt 12 the upper pendulum bolt 12 extending essentially perpendicular to the longitudinal axis of the traverse 20. The stop plates 6 are clear from the respective inner sides of the cabin-brackets 21 in perpendicular direction to the longitudinal axis of the traverse 20. The LG-retainer 5 with integrated clamping rings 1 is mounted directly, —i.e. without any interposed elastomer ring 3,—on the traverse 20 and is blocked from rotation about the traverse 20 by the screw connection s.

Shear resistant spring pads 41 are mounted between a flange 42 mounted to the cabin-brackets 21 and two levers 43 mounted essentially symmetrical with regard to the longitudinal axis of the traverse 20 to the LG-retainer 5. To limit amplitudes between the cabin-brackets 21 and the LG-retainer 5 respectively abutments interacting with stops are provided.

REFERENCE LIST

1—clamp ring
3—elastomer ring
5—LG-retainer
6—stop plate
7—outer cabin clamp mount
8—spring fork
9—pendulum
10—inner cabin clamp mount (side 2)
11—neutral position
12—upper pendulum bolt
13—lower pendulum bolt
14—torque support bolt
15—torque support bearing
16—washer
17—spring bolt
18—upper pendulum bearing
19—lower pendulum bearing
20—traverse
21—existing cabin bracket
22—fork bolt
23—compound spring
24—bracket
25—screwing connections
26—screw connections
27—screws
28—stop
29—longitudinal axis of the traverse
30—bolt connection
31—further bracket
32—rod
33—gravity center
34—still further bracket
35—short rod
36—another bracket
37—central rod
38—still another bracket
39—offset rod
40—abutment
41—spring pad
42—flange
43—lever

What is claimed is:

1. An attachment connecting a helicopter cabin extending in a longitudinal direction to a landing gear traverse extending in a transverse direction generally perpendicular to the longitudinal direction, the attachment comprising:
   a bracket extending from the helicopter cabin;
   a landing gear retainer secured around the landing gear traverse and hinged to the bracket;
   a pendulum comprising:
      a lower pendulum bolt connected to the bracket below the landing gear retainer to rotate about a lower rotational axis parallel to the longitudinal direction;
      at least one upper pendulum bolt connected to the landing gear retainer; and
      at least one connecting rod connected to the lower and upper pendulum bolts to pivot;
   wherein the landing gear retainer is hinged to the bracket by the pendulum to move in the landing gear transverse direction relative to the helicopter cabin.

2. The attachment according to claim 1, wherein the upper pendulum bolt is generally co-linear with a central axis of the landing gear traverse.

3. The attachment according to claim 2, wherein the connecting rod is offset from a centerline of the landing gear traverse.

4. The attachment according to claim 3, wherein the at least one connecting rod comprises two connecting rods symmetric about the centerline of the landing gear traverse.

5. The attachment according to claim 4, wherein the at least one upper pendulum bolt comprises two upper pendulum bolts, wherein one of the connecting rods is connected to each of the upper pendulum bolts.

6. The attachment according to claim 1, wherein the upper pendulum bolt is positioned below the landing gear traverse.

7. The attachment according to claim 6, wherein the at least one connecting rod comprises two connecting rods connected between the upper and lower pendulum bolts.

8. The attachment according to claim 1, wherein the landing gear retainer comprises a ring being coaxial with the transverse direction.

9. The attachment according to claim 8, wherein the ring comprises a clamp ring having a screw for tightening the clamp ring on the landing gear traverse to prevent movement of the landing gear traverse relative to the landing gear retainer.

10. The attachment according to claim 1, further comprising at least one compound spring generally perpendicular to the upper and lower pendulum bolts.

11. The attachment according to claim 10, wherein the at least one compound spring includes a spring bolt and a plurality of springs.

12. The attachment according to claim 1, further comprising stop plates positioned between the landing gear retainer and the bracket to limit motion of the transverse in the longitudinal direction.

13. The attachment according to claim 12, wherein the stop plates have a friction coefficient between 0.5 and 0.15.

14. An attachment bracket connecting a helicopter cabin extending a longitudinal direction to a landing gear traverse extending in a transverse direction generally perpendicular to the longitudinal direction, the attachment bracket comprising:
- a bracket connected to the helicopter cabin;
- a landing gear retainer connected to the helicopter cabin and secured around the landing gear traverse and coaxial with the transverse direction; and
- a pendulum hinged to the cabin with a lower pendulum bolt in a lower pendulum bearing, and the pendulum hinged to the landing gear retainer with an upper pendulum bolt in an upper pendulum bearing, wherein the upper pendulum bolt is generally co-linear with a central axis of the landing gear traverse; and
- an offset rod connecting the upper and lower pendulum bolts,
- wherein the pendulum provides mobility of the helicopter cabin in the landing gear traverse direction.

15. The attachment according to claim 14, further comprising a second offset connecting rod connecting the upper and lower pendulum bolts.

16. The attachment according to claim 14, further comprising a second upper pendulum bolt.

17. The attachment according to claim 14, further comprising at least one compound spring generally perpendicular to the upper and lower pendulum bolts.

18. The attachment according to claim 14, wherein the upper and lower pendulum bolts are mounted on one side of the transverse.

19. The attachment according to claim 14, further comprising:
- a lever extending from the landing gear retainer;
- a flange extending from the bracket; and
- a spring pad positioned between the lever and the flange to limit amplitude of movement of the transverse in the longitudinal direction.

* * * * *